Oct. 6, 1964  H. E. PEYREBRUNE  3,151,552
SPRING GRIPPER ASSEMBLY
Filed April 17, 1963  2 Sheets-Sheet 1
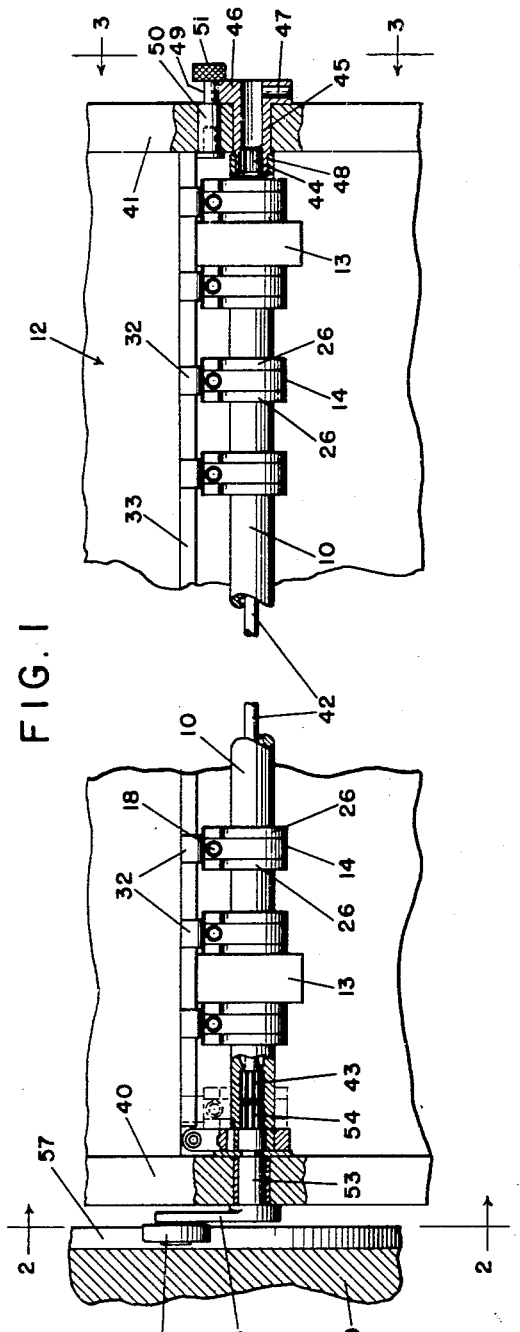
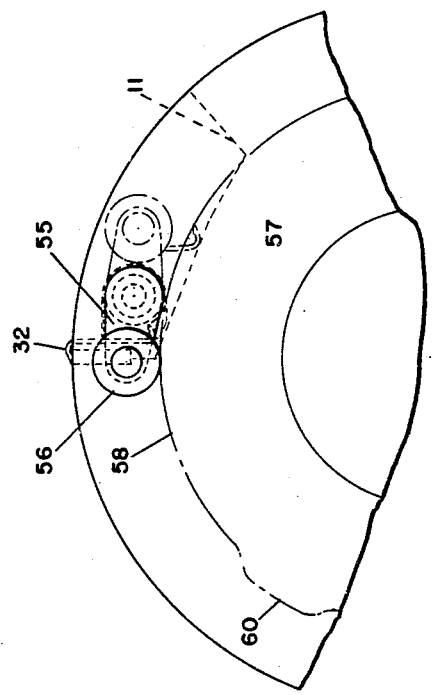
INVENTOR.
HENRI E. PEYREBRUNE
BY
Byron Hume Groen + Clement
Attys Oct. 6, 1964    H. E. PEYREBRUNE    3,151,552
SPRING GRIPPER ASSEMBLY
Filed April 17, 1963    2 Sheets-Sheet 2

INVENTOR.
HENRI E. PEYREBRUNE
BY
Byron Hume Green & Clement
Attys

United States Patent Office 3,151,552
Patented Oct. 6, 1964

3,151,552
SPRING GRIPPER ASSEMBLY
Henri E. Peyrebrune, River Forest, Ill., assignor to Miehle-Goss-Dexter, Incorporated, Chicago, Ill., a corporation of Delaware
Filed Apr. 17, 1963, Ser. No. 273,636
9 Claims. (Cl. 101—409)

The invention relates to sheet gripping devices for a printing press and has reference in particular to a sheet gripper assembly of maximum simplicity and which will require less space in the gap of the impression cylinder so that the size of the gap can be correspondingly reduced.

In small diameter impression cylinders, for example, it is imperative that the cross section modulus be kept as large and as nearly uniform as possible to insure minimum deflection under impression pressure. Consequently, the space available for the sheet gripping elements is materially limited. Gripper assemblies embodying the improvements of the invention will occupy a minimum of space while still leaving sufficient space for the gripper pad and the tympan clamping mechanism. Accordingly, the present gripping assembly is capable of meeting unprecedented requirements for precision relief printing from thin, shallow-etched, flexible plates printing on small diameter impression cylinders.

The above and other advantages of the invention basically result from the fact that the gripper finger spring encircles the hub clamping screw so as to have concentric relation therewith. This places the clamping screw and the gripper spring in a most efficient location for direct action and with minimum friction on the pivot.

Another object resides in the provision of a gripper assembly as above described, wherein adjustment of the screw for clamping the hub member on the gripper shaft controls the deformation of the hub in a manner to render the gripping spring effective in the sheet holding position.

A further object is to provide a gripper assembly wherein the force of the gripper spring is applied to the sheet gripping finger of the assembly in a direction perpendicular to the sheet holding surface of the gripper pad.

Another object of the invention resides in the provision of an improved sheet gripper assembly wherein all the advantages of the gripper structure disclosed in Patent 2,599,776 are obtained in addition to gerater simplicity, greater convenience of adjustment and improved mechanical efficiency.

With these and various other objects in view, the invention may consist of certain novel features of construction and operation, as will be more fully described and particularly pointed out in the specification, claims and drawings appended thereto.

In the drawings which illustrate an embodiment of the device and wherein like reference characters are used to designate like parts—

FIGURE 1 is a top plan view showing a plurality of the gripper assemblies of the invention applied to the gripper shaft of a sheet carrying cylinder and including actuating means therefor, with parts being shown in section;

FIGURE 2 is a fragmentary, side elevational view taken substantially along line 2—2 of FIGURE 1;

FIGURE 3 is a fragmentary, side elevational view taken substantially along line 3—3 of FIGURE 1;

Figure 4:
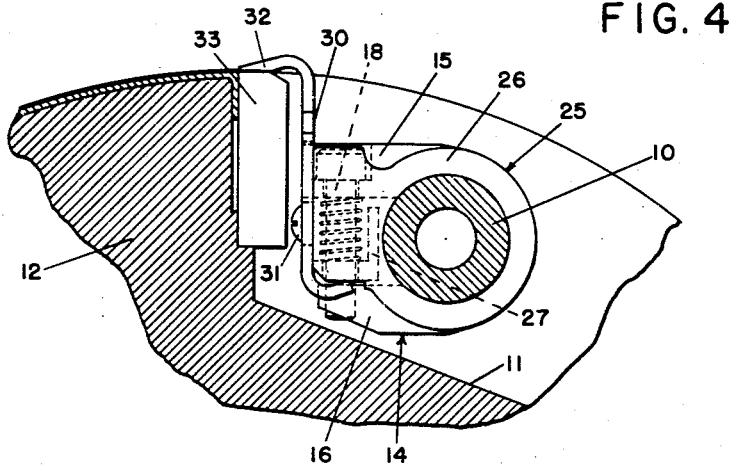
FIGURE 4 is a fragmentary sectional view on an enlarged scale showing the gripper assembly of the invention with its sheet gripping fingers closed on the cylinder gripper pad.
Figure 5:
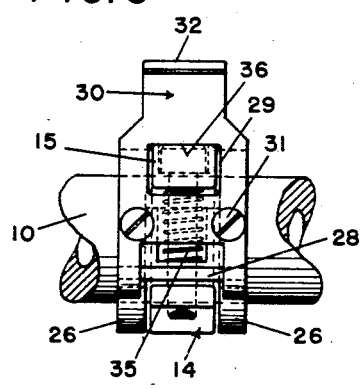
FIGURE 5 is a front elevational view of the gripper assembly shown in FIGURE 4.

The improved gripper unit is shown in FIGURES 4 to 8, inclusive, as applied to a gripper shaft 10 mounted within the gap 11 of a sheet carrying cylinder 12, a portion of which is shown in FIGURE 4. The unit includes the hub member 14, generally C-shaped in transverse section and having a top arm 15 and a bottom arm 16. The interior circular contour 17 of the member 14 is approximately the same in diameter as that of the gripper shaft 10 so that the hub member can be mounted on the shaft and moved longitudinally of the shaft to the desired location. The hub member is then clamped to the shaft by means of the clamping screw 18. The head 20 of the clamping screw 18 is received within the recess 21 formed in the top surface of arm 15 and the threaded end 22 is threadedly received in the lower arm 16. The head has a hexagonal shaped recess 23 for receiving a suitable tool whereby the clamping screw 18 can be rotated for clamping the hub member to the shaft by drawing the arms together.

A bifurcated form of supporting member 25 is associated with the hub member 14 in a manner whereby the ring portions 26 of the supporting member are located on respective sides of the hub. The ring portions 26 are free to rotate on the gripper shaft and said ring portions are connected by the integral L-shaped transverse bar having an upright part 27 and base part 28. The clamping screw 18 passes through an opening in the base part 28 provided for the purpose. Accordingly, the two ring portions 26 and the connecting bar 27, 28 move as a unit and said unit has the sheet gripper element 30 secured thereto by the screws 31 with a screw being received in the ring portions, respectively. The top end of the gripper element 30 is bent to provide the sheet gripping finger 32 and the bottom end is curved at 34 to fit under the base part 28. The gripper element also is provided with a rectangular opening 29 into which the end of the arm 15 of hub member 14 is adapted to project. The sheet gripping finger 32 has contact with the cylinder pad 33 located in the gap 11 of the cylinder.

The means for retaining the sheet gripping fingers 32 in pressure contact with the pad 33 comprises the coil spring 35 which encircles the clamping screw 18 so as to have concentric relation therewith. The said coil spring 35 is adapted to be confined between the top arm 15 and the base part 28 and thus the pressure of the spring is exerted between the arm 15 and the connecting base part 28 of the unitary supporting member and thereby to the sheet gripping fingers 32 when the gripper assembly is in its sheet gripping position.

Figure 7:
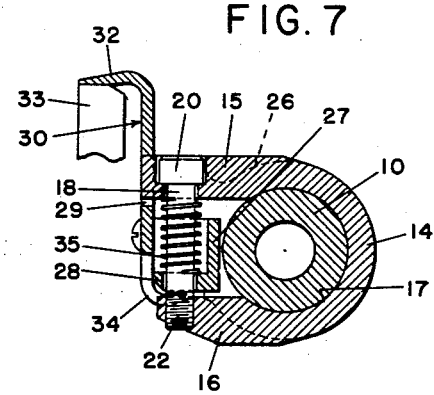
FIGURE 7 is a transverse sectional view showing the hub member on the gripper shaft in advance of clamping.
Figure 6:
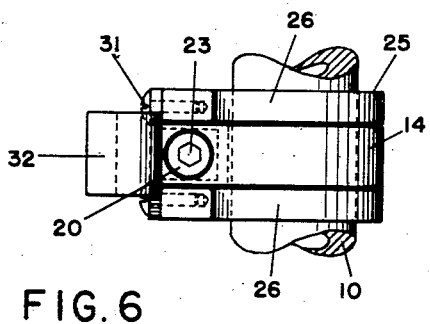
FIGURE 6 is a top plan view of the gripper assembly.

In the position of the gripper assembly as shown in FIGURE 7, the hub 14 is loose on the shaft and the spring 35 exerts pressure between the arm 15 and base part 28 tending to move the hub and supporting member, respectively, in opposite directions about the axis of the shaft 10. Such relative movement is restricted, however, by engagement of the arm 15 with the edge 36 of the rectangular opening 29.

With the finger 32 in contact with the pad 33 the screw 20 is tightened to lock the assembly in position on the shaft 10. The fit between the hub 14 and shaft 10 is such that a partial turn of the screw 20 is sufficient to clamp the hub securely to the shaft 10. However, the screw 20 is tightened beyond this point until the arm 15 is deformed to an extent that clearance is provided between the arm 15 and the edge 36 of the opening 29.

This causes the spring 35 to urge the finger 32 against the pad 33.

Each gripper in a series is set in the same manner so that the same clearance, preferably about .003 inch, between arm 15 and edge 36 is provided, which insures that each gripper in the series will bear on its respective pad with equal pressure and that all of the grippers will open in precise synchronism upon rotation of the shaft 10 in a clockwise direction.

The location and concentric relation of the gripper spring 35 and the clamping screw 18 is an important structural feature of the invention and is primarily responsible for the improved advantages that are obtained. These elements are purposely located between the gripper shaft and the cylinder pad and in a manner that force of the spring 35 is exerted in a direction substantially perpendicular to the sheet gripping surface of the pad 33. This is a distinct advantage because it eliminates the tendency of the finger to spread or slide relative to the pad as it contacts the latter, thereby adversely affecting the register position of the sheet and which condition is inherent in all previous gripper assemblies.

FIGURE 1 illustrates a number of sheet gripper units mounted on the gripper shaft 10 of a sheet carrying cylinder 12 and additionally illustrates means for oscillating the shaft as the cylinder rotates during a printing operation. The shaft 10 is rotatably mounted in bearing blocks 13 located between the side plates 40 and 41 of the cylinder 12, and a number of sheet gripper units embodying the improvements of the invention are secured in spaced relation longitudinally of the shaft. The shaft is tubular and for illustrative purposes a torsion bar 42 is mounted within the hollow shaft, being fixed at one end to the shaft and at its other end to a side plate of the cylinder.

As shown in FIGURE 1 the left end of the torsion bar is fixed to the shaft for rotation therewith by means of the spline 43. The spline 44 at the right hand end of the torsion bar is fixed against rotation with the shaft 10 and is inserted into the correspondingly splined end of a hollow stud shaft 45. The latter is rotatably mounted in the side plate 41 and is provided with a circular flange portion 46 integral therewith which is located exteriorly of the side plate. The inside end of the stud shaft is reduced in diameter at 48 and this reduced end of the stud shaft journals the right hand end of the shaft 10 independently of the torsion bar.

The stud shaft 45 is adapted to be retained in either one of two positions by means of the locking member 50 having the knurled handle portion 51 and which member is adapted to fit into either one of the two semi-circular recesses 52 or 52' formed in the periphery of the flange portion 46. In the position illustrated in FIGURE 3, the flange 46 is positioned so that member 50 is located in recess 52 in which position the torsion bar is preloaded to maintain the gripper fingers 32 in pressure contact with their associated pads 33 as illustrated in FIGURE 2. By inserting a pin wrench in the hole 47, the tension on the locking member may be relieved whereupon the flattened surface 49 of the locking member can be rotated to a position so as to release the flange 46 and permit it to be turned in a counter-clockwise direction until notch 52' is aligned therewith. This will relieve the tension on the torsion bar and cause the complete gripper assembly to be rotated to a retracted position as indicated by the broken lines in FIGURE 2 to provide access to the tympan clamping mechanism and other elements of the cylinder. The assembly can be locked in this retracted position by rotating member 50 to engage in recess 52' so that the cylinder 12 may be rotated for make-ready purposes without danger of interference.

The side plate 40 of the cylinder journals a second stud shaft 53 having the splined end 54 which is inserted into the correspondingly splined left end of the tubular shaft 10. The stud shaft 53, exteriorly of the side plate 40, is formed to provide a crank arm 55 which carries the roller 56 having rolling contact on the stationary cam 57 secured to the side frame 59.

As the cylinder 12 rotates during a printing operation the roller 56 is caused to roll on the stationary cam 57 and the torsion bar 42 acts as spring means to maintain the roller in contact with the contoured surface of the cam. When the roller 56 is in contact with the low portion 58 of the cam, the spring gripping fingers 32 will be closed in pressure engagement with their coacting cylinder pads 33 to grip and hold a sheet in registered position on the cylinder. When the roller contacts the high circular portion 60 of the cam, the crank arm 55 fill rock the shaft 10 and therewith the gripper fingers in a clockwise direction, FIGURE 2, against the force of the torsion bar, to open the grippers and effect release of the sheet.

Figure 8:
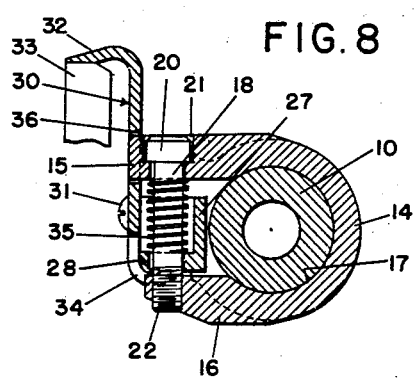
FIGURE 8 is a transverse sectional view similar to FIGURE 7 but showing the hub member clamped on the gripper shaft.

From the foregoing description it will be evident that the gripper assembly of the invention locates the clamping screw 18 and the encircling coil spring 35 between the gripper shaft and the cylinder pad. This is a most efficient location for said parts, since it permits direct action with minimum friction on the pivot. Also, it will be noted that the screw and spring are disposed in a manner that when the grippers are in the closed position, the force of the spring is exerted in a direction perpendicular to the sheet holding surface of the pad. When the hub member is clamped on the gripper shaft as shown in FIGURE 8, the arms are deformed to an extent which spaces the end of arm 15 from the top edge of the opening 36 in the element 30. The coil spring 35 is thus rendered effective for applying pressure on the sheet gripping fingers 32 to hold the fingers against the pad. By proper adjustment of the clamping screw, the end of arm 15 of each gripper assembly can be spaced the same distance from the top edge of opening 36. Accordingly the gripper fingers of the assembly will release the sheet simultaneously, thereby avoiding any disturbance in the register of the sheet.

The invention is not to be limited to or by details of construction of the particular embodiment thereof illustrated by the drawings as various other forms of the device will of course be apparent to those skilled in the art without departing from the spirit of the invention or the scope of the claims.

I claim:

1. In sheet gripper mechanism, in combination with a gripper shaft, of a plurality of gripper assemblies on said shaft, each assembly including a hub member mounted on the shaft and having a pair of spaced projecting arms, a clamping screw connecting the arms and clamping the hub member on the shaft by drawing the arms towards each other, a supporting unit including ring portions mounted on the shaft for free rotation and disposed on respective sides of the hub member, a base part connecting the ring portions and extending between the arms so that the clamping screw passes through the base part, a coil spring encircling the clamping screw and being confined between the base part and one of said arms, and an element secured to the supporting unit and providing a sheet gripping finger.

2. In sheet gripper mechanism, in combination with a gripper shaft, of a plurality of gripper assemblies on said shaft, each assembly including a hub member mounted on the shaft and having top and bottom arms in spaced laterally projecting relation, a clamping screw connecting the arms and clamping the hub member on the shaft by drawing the arms towards each other, a supporting unit including a pair of spaced ring portions and a base part connecting the ring portions, said ring portions being mounted on the shaft for free rotation and being disposed on respective sides of the hub member with the base part extending between the arms so that the clamping screw passes through the base part, a coil spring encircling the clamping screw and being confined between the base part and the top arm of the hub member, and an element secured to the supporting unit and providing a sheet gripping finger.

3. In sheet gripper mechanism as defined by claim 2, wherein rotation of the clamping screw for clamping the hub member on the shaft by drawing the arms closer to each other has the effect of increasing the compression force of the coil spring exerted on the said base part.

4. In sheet gripper mechanism as defined by claim 2, wherein the clamping screw has a head portion at one end and has its opposite end threaded, and wherein the head portion of the clamping screw is received within a recess in the top arm with the threaded end of the screw being threaded in the bottom arm.

5. In sheet gripper mechanism, in combination with a gripper shaft and a cylinder gripper pad providing a sheet gripping surface, of a plurality of gripper assemblies on said shaft, each assembly including a hub member mounted on the shaft and having spaced top and bottom arms projecting laterally towards the gripper pad, a clamping screw connecting the arms and clamping the hub member on the shaft by drawing the arms towards each other, a supporting unit including a pair of spaced ring portions and a base part connecting the ring portions, said ring portions being mounted on the shaft for free rotation and being disposed on respective sides of the hub member with the base part extending between the arms so that the clamping screw passes through the base part, a coil spring encircling the clamping screw and being confined between the base part and the top arm of the hub member, and an element secured to the supporting unit and providing a sheet gripping finger adapted to contact the sheet gripping surface of the pad, said clamping screw and coil spring being located between the gripper shaft and the cylinder pad and said parts being so positioned that the compression force of the coil spring on the base part is applied in a direction substantially perpendicular to the sheet gripping surface of the pad.

6. In sheet gripper mechanism, a cylinder gripper pad providing a sheet gripping surface, an oscillatable shaft, a sheet gripper assembly mounted on the shaft, said assembly including a hub member mounted on the shaft and having spaced top and bottom arms projecting laterally towards the gripper pad and in a plane approximately parallel to the sheet gripping surface of the pad, a clamping screw connecting the arms for clamping the member on the shaft by drawing the arms towards each other, a supporting unit including a pair of spaced ring portions and a base part connecting the ring portions, said ring portions being mounted on the shaft for free rotation and being disposed on respective sides of the hub member with the base part extending between the arms so that the clamping screw passes through the base part, a coil spring encircling the clamping screw and being confined between the top arm of the hub member and the base part, whereby the coil spring applies a compression force on the base part, and an element secured to the supporting unit and providing a sheet gripping finger adapted to contact the sheet gripping surface of the pad.

7. In sheet gripper mechanism as defined by claim 6, wherein said clamping screw and coil spring are located between the oscillatable shaft and the cylinder gripper pad, and wherein said parts are so positioned that the compression force of the coil spring on the base part is applied in a direction substantially perpendicular to the sheet gripping surface of the pad.

8. In sheet gripper mechanism, the combination with a relatively fixed gripper pad having a sheet engaging surface and an oscillatable gripper shaft spaced from said pad, of a gripper assembly mounted on said shaft for movement therewith to and from a sheet gripping position relative to said pad, said assembly including a hub member adapted to be clamped to said shaft and a gripper finger pivotally mounted on said shaft, a screw for clamping the hub member to the shaft, a coil spring encircling said screw and confined between said hub member and said gripper finger, said spring having operation to resiliently urge the gripper finger into contact with the pad upon movement of the shaft and therewith the gripper assembly to the sheet gripping position, said screw and said spring, in the sheet gripping position, being located between the shaft and said pad with their axes perpendicular to the said sheet engaging surface whereby the force exerted by said spring upon said finger is in a direction toward and substantially perpendicular to said sheet engaging surface, and means for oscillating said shaft and therewith said gripper assembly to and from the sheet gripping position.

9. In sheet gripper mechanism the combination including a gripper pad having a sheet engaging surface, an oscillatable shaft spaced from said pad, a hub member mounted on said shaft and having spaced top and bottom arms projecting laterally therefrom, a supporting unit rotatably mounted on the shaft and having a base part extending between said arms, a gripper finger fixed to the supporting unit and adapted to contact the said surface of the pad when the finger is in a closed position, said gripper finger having an opening to receive the end of said top arm, said opening being larger in a circumferential direction than the cross-sectional area of said arm and having operation to limit the extent of relative motion between the hub member and the supporting unit, a coil spring confined between the said base part and said top arm and having operation when said finger is in an open position to maintain the top arm in contact with one edge of the said opening in the gripper finger, and a clamping screw located coaxially within the coil spring and connecting the top and bottom arms of the hub member, said clamping screw being adjustable to initially clamp the hub member to the shaft and to thereafter deflect the top arm to an extent that a predetermined clearance is provided between the top arm and the said edge of the opening in the gripper finger when said finger is closed on said pad.

References Cited in the file of this patent

UNITED STATES PATENTS

| | | |
|---|---|---|
| 1,483,057 | Warsen | Feb. 5, 1924 |
| 2,599,776 | Peyrebrune | June 10, 1952 |

FOREIGN PATENTS

| | | |
|---|---|---|
| 495,453 | Germany | Mar. 20, 1930 |